(12) United States Patent
Kashiwase et al.

(10) Patent No.: US 6,915,780 B2
(45) Date of Patent: Jul. 12, 2005

(54) COMBUSTION PRESSURE DATA COLLECTION SYSTEM FOR MULTI-CYLINDER ENGINE

(75) Inventors: Hajime Kashiwase, Tokyo (JP); Hiromichi Watanabe, Tokyo (JP); Hiroshi Yokoyama, Saitama (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/943,570

(22) Filed: Sep. 17, 2004

(65) Prior Publication Data

US 2005/0061296 A1 Mar. 24, 2005

(30) Foreign Application Priority Data

Sep. 19, 2003 (JP) ........................................ 2003-328932

(51) Int. Cl.[7] ................................................ F02D 7/00
(52) U.S. Cl. .................. 123/395; 123/52.1; 123/406.12
(58) Field of Search ............................... 123/52.1, 395, 123/406.12, 406.17, 406.22, 406.41, 435; 73/116, 35.12

(56) References Cited

U.S. PATENT DOCUMENTS 5,276,625 A * 1/1994 Nakaniwa ................... 701/111

FOREIGN PATENT DOCUMENTS

JP    3123798 B2    10/2003

* cited by examiner

*Primary Examiner*—Bibhu Mohanty
(74) *Attorney, Agent, or Firm*—Darby & Darby (57) ABSTRACT

A combustion pressure data collection system for a multi-cylinder engine includes a cylinder pressure sensor, an amplifier unit, and a channel switching unit. The cylinder pressure sensor directly detect a combustion pressure of respective cylinders, the amplifier unit converts a charge signal from the cylinder pressure sensor into voltage signal and have an automatic correction function for automatically correcting a voltage output level so that the level is setted to the same level before and after the cylinder pressure sensor generate a charge, and the amplifier unit of the respective cylinders is connected to the channel switching unit. A channel for actuating to be measured is selected from signals of a plurality of channels supplied from the amplifier units in response to a channel selection signal output from an electronic engine control unit, and combustion pressure data are outputted to the electronic engine control unit from the cylinder of the channel, thereby combustion pressure data can be effectively collected by a simple arrangement without complex processing.

2 Claims, 7 Drawing Sheets

FIG.7

COMBUSTION PRESSURE DATA COLLECTION SYSTEM FOR MULTI-CYLINDER ENGINE

The disclosure of Japanese Patent Application No. 2003-328932 filed on Sep. 19, 2003 including the specification, drawings and abstract is incorporated by reference in its entirely.

BACKGROUND OF THE INVENTION

1. Field of the Invention

The present invention relates to a combustion pressure data collection system for a multi-cylinder engine for collecting combustion pressure data of respective cylinders by measuring a combustion pressure of each cylinder.

2. Description of the Related Art

At present, internal combustion engines including automobile engines have been required to improve a combustion efficiency to reduce $CO_2$ as well as to reduce harmful exhaust emissions for global environmental protection. In contrast, the automobile engines are used particularly in a wide range of engine rotations (RPM) such as those at a start of the engine, in an idling state, and in traveling at a low to medium speed and at a high speed as well as in a wide range of load conditions, and the like. Accordingly, the automobile engine must be controlled optimally assuming all the states of the engine described. For this purpose, in general, there has been developed an art for optimizing an engine control by measuring and analyzing a change of a combustion gas pressure using a sensor for measuring a combustion state of the engine as a means for confirming whether or not the engine is controlled properly.

That is, it is possible to correct the combustion gas pressure to an optimum pressure at all times by automatically controlling the engine optimally by an engine control system for measuring the combustion gas pressure in each cylinder. Accordingly, the engine can be controlled in accordance with a state in which it is used as well as can be controlled optimally at all times even if there are small differences due to allowable tolerances among respective engines or among respective cylinders or even if performance of the engine changes due to partial changes of respective units of the engine which are caused by using the engine for a long time, thereby the combustion efficiency can be improved to reduce $CO_2$ and to reduce harmful exhaust emissions.

A pressure sensor (cylinder pressure sensor) using a piezoelectric device as disclosed in, for example, Japanese Patent No. 3123798 is generally used as a sensor for measuring the combustion pressure. In this case, a charge amplifier is generally used as an amplifier circuit for converting a charge signal generated by the piezoelectric device into a voltage signal and using the voltage signal as an input signal for controlling the engine.

In a multi-cylinder engine, it is preferable to provide cylinder pressure sensors for measuring combustion pressures with the respective cylinders and to optimally control the respective cylinders by measuring the combustion pressures of the respective cylinders in respective cycles in order to derive a full performance thereof, to improve a combustion efficiency for reducing $CO_2$ gases and to reduce harmful exhaust emissions.

However, when signals outputted from the cylinder pressure sensors attached to all the cylinders are measured, a charge leakage between a piezoelectric device and a charge amplifier, an individual difference among the cylinder pressure sensors, and a change of output signal due to a temperature change must be taken into consideration. Accordingly, not only a large load imposes on an engine controller but also the controller becomes complex and increases a size thereof as well as mating steps between the pressure sensors and the controller, and the number of wirings between the cylinder pressure sensors and the controller are increased. That is, in general, the cylinder pressure sensor for measuring the combustion pressure is disadvantageous in handling thereof due to a structural complexity thereof including many circuits, and thus a cost is largely increased to utilize the cylinder pressure sensor together with a main body thereof.

SUMMARY OF THE INVENTION

An object of the present invention is to provide a combustion pressure data collection system for the multi-cylinder engine that can effectively collect combustion pressure data of respective cylinders by a simple structure without executing complex processings.

To exlain briefly, the combustion pressure data collection system for the multi-cylinder engine of the present invention includes cylinder pressure sensors attached to respective cylinders for outputting a charge signal according to respective cylinder pressures, amplifier circuits connected to the cylinder pressure sensors for converting a charge signal from the cylinder pressure sensors into a voltage signal and outputting the voltage signal as well as automatically correcting a voltage output level so that the voltage levels are set to the same level before and after the cylinder pressure sensor generate the charge, and a switching circuit for selecting a channel measured from the output signal of the amplifier circuit of the respective cylinders in response to a signal based on a determination result of the cylinder and for outputting the combustion pressure data.

DESCRIPTION OF THE PREFERRED EMBODIMENTS

Figure 1:
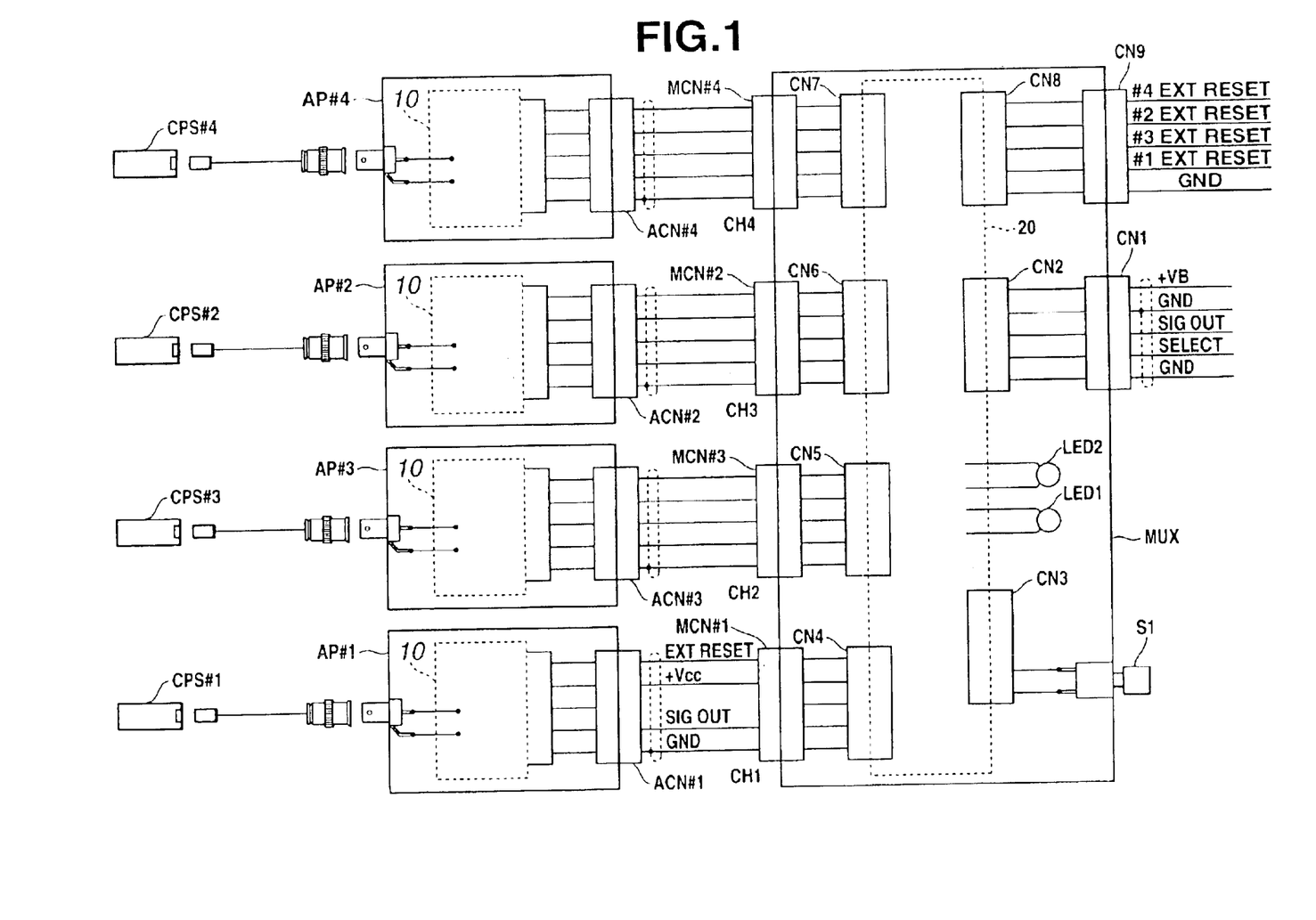
FIG. 1 is a schematic circuit diagram of a combustion pressure data collection system according to a first embodiment of the present invention.

First, a first embodiment of the present invention will be explained. A combustion pressure data collection system shown in FIG. 1 is an example of the system applied to a four-cylinder engine and is operated by a single power source by an onboard battery. The combustion pressure data collection system includes a cylinder pressure sensor CPS#n (n=1, 2, 3, 4; hereinafter, suffix #n shows a cylinder number), an amplifier unit AP#n, and a channel switching unit MUX. The cylinder pressure sensor CPS#n is disposed to each cylinder of the engine and directly detects a combustion pressure in the cylinder. The amplifier unit AP#n amplifies a signal from the cylinder pressure sensor CPS#n.

The channel switching unit MUX selects a channel of the signal to be measured of a plurality of the channels of signals from the amplifier unit AP#n in response to a channel selection signal having a predetermined pulse train which is output from an electronic engine control unit (ECU, not shown) in synchronism with rotations of the engine and outputs the combustion pressure data.

The cylinder pressure sensor CPS#n of each cylinder is connected to the amplifier unit AP#n corresponding thereto. Each amplifier unit AP#n has an external connector ACN#n which is connected to an external connector MCN#n of data selection channels of the channel switching unit MUX. The channel switching unit MUX is further connected to the ECU through external connectors CN1 and CN9.

Note that, in the embodiment, combustion or firing order is executed in the cylinders of the engine in a sequence of from a #1 cylinder to a #4 cylinder through #3 and #2 cylinders. In the data selection channel, a channel CH1 corresponds to the #1 cylinder, a channel CH2 corresponds to the #3 cylinder, a channel CH3 corresponds to the #2 cylinder, and a channel CH4 corresponds to the #4 cylinder in correspondence to the above sequence of combustions.

Accordingly, an input/output of an external connector MCN#1 of the channel switching unit MUX connected to a cylinder pressure sensor CPS#1 and an amplifier unit AP#1 of the #1 cylinder corresponds to the channel CH1, the input/output of an external connector MCN#2 of the channel switching unit MUX connected to a cylinder pressure sensor CPS#2 and an amplifier unit AP#2 of the #2 cylinder corresponds to the channel CH3, the input/output of an external connector MCN#3 of the channel switching unit MUX connected to a cylinder pressure sensor CPS#3 and an amplifier unit AP#3 of the #3 cylinder corresponds to the channel CH2, and the input/output of an external connector MCN#4 of the channel switching unit MUX connected to a cylinder pressure sensor CPS#4 and an amplifier unit AP#4 of the #4 cylinder corresponds to the channel CH4.

In the embodiment, the cylinder pressure sensor CPS#n is a sensor making use of a piezoelectric device and generates a charge proportional to a pressure. Further, an amplifier circuit 10 included in each amplifier unit AP#n is a charge-voltage conversion amplifier for converting a charge signal into a voltage. The amplifier circuit 10 has an automatic correcting function for automatically correcting positive and negative drifts to cope with a drift at a zero point due to a charge leakage and a temperature change.

Figure 2:
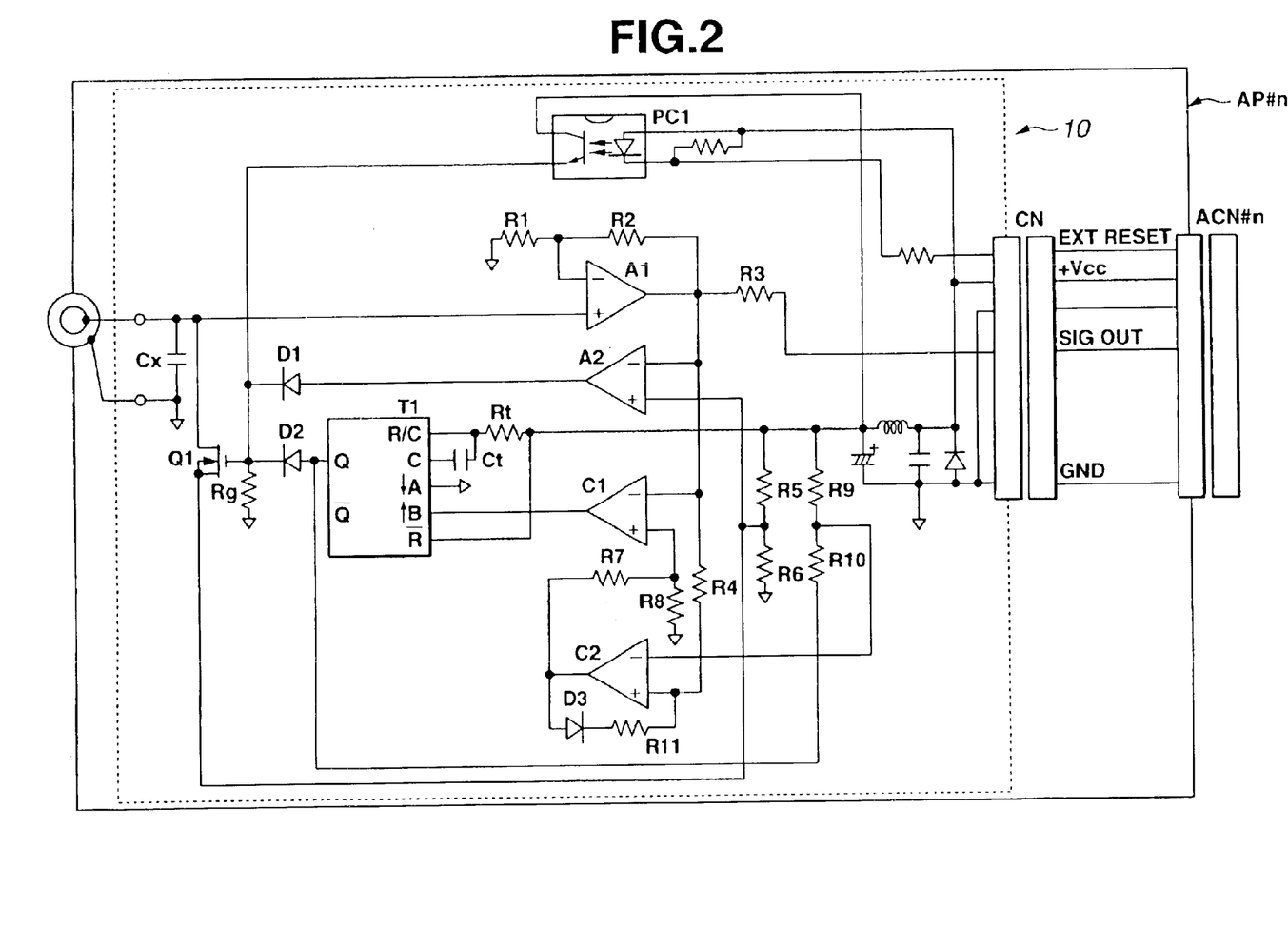
FIG. 2 is a circuit arrangement view of an amplifier unit according to the first embodiment.

FIG. 2 is a circuit arrangement view showing an example of the amplifier circuit 10. The amplifier circuit 10 includes a signal conversion circuit for converting the charge signal into the voltage signal and an automatic correction circuit for automatically correcting the positive and negative drifts at the zero point. The signal conversion circuit has a voltage conversion capacitor Cx for accumulating the charge generated in the cylinder pressure sensor CPS#n and an amplifier A1 for amplifying a voltage of the voltage conversion capacitor Cx and outputting thereof. The automatic correction circuit is mainly has an amplifier A2, comparators C1 and C2, a timer T1, and an N channel MOS type field effect transistor Q1.

Specifically, an output side of the cylinder pressure sensor CPS#n is connected so as to accumulate a generated charge to the voltage conversion capacitor Cx of the amplifier circuit 10 and connected such that the voltage resulting from the charge accumulated in the voltage conversion capacitor Cx is input to a no-inverting input terminal of the amplifier A1. An output terminal of the amplifier A1 is branched to three channels, and a first channel is directly connected to a substrate connector CN through a resistor R3 and connected from the substrate connector CN to the channel switching unit MUX through the external connector ACN#n. A second channel is connected to an inverting input terminal of the amplifier A1 through a resistor R2 and is grounded through a resistor R1. A third channel is connected to an inverting input terminal of the amplifier A2 and to an inverting input terminal of the comparator C1 is simultaneously connected to the no-inverting input terminal of the comparator C2 through a resistor R4.

The amplifier A2 is an inversion type amplifier for detecting the negative drift of the sensor output, and a reference voltage Vref (example +2 mV), which is obtained by dividing a circuit voltage Vcc (example, +5 V (DC)) by resistors R5 and R6, is applied to the no-inverting input terminal of the amplifier A2. The reference voltage Vref is the voltage for determining a "0", point in a single power supply operation, and the amplifier A2 operates with the reference voltage Vref set as "0", the voltage equal to or smaller than the reference voltage Vref set as a negative voltage, and a larger voltage than the reference voltage Vref set as a positive voltage.

The comparators C1 and C2 correct a positive side drift of the sensor output. A comparative voltage Vr1, which is obtained by dividing an output of the comparator C2 by resistors R7 and R8, is applied to the no-inverting input terminal of the comparator C1. A comparative voltage Vr2, which is divided by resistors R9 and R10, which connect the circuit voltage Vcc to an output (output Q) terminal of the timer T1, is applied to an inverting input terminal of the comparator C2. An output terminal of the comparator C1 is connected to a trigger input (input B) terminal of the timer T1. The output terminal of the comparator C2 is connected to the no-inverting input terminal of the comparator C1 through the resistor R7 as well as connected to the no-inverting input terminal thereof through a forward diode D3 and a resistor R11.

The timer T1 outputs a one-shot pulse having a pulse width determined by an external resistor Rt and an external capacitor Ct using a rising edge of the output of the comparator C1 as a trigger. The output Q terminal of the timer T1 and an output terminal of the amplifier A2 are connected to a gate of the field effect transistor Q1, respectively through an OR circuit with diodes D1 and D2. The gate of the field effect transistor Q1 is grounded through a gate resistor Rg, a drain thereof is connected to the voltage conversion capacitor Cx and to the no-inverting input terminal of the amplifier A1, and a source thereof is connected to a potential point for applying a reference voltage by resistors R5 and R6.

In the embodiment, an output terminal of a photo coupler PC1 is connected to the gate of the field effect transistor Q1. When an external reset signal is inputted to an input terminal of the photo coupler PC1 from the external connector ACN#n through the substrate connector CN, electric discharge is executed from an input side of the amplifier A1 by forcibly turning on the field effect transistor Q1.

In contrast, as shown in FIG. 1, the channel switching unit MUX contains a switching circuit 20 mainly composed of a multiplexer. The channel switching unit MUX is provided with two light emitting diodes LED1 and LED2 and a switch S1. The light emitting diodes LED1 and LED2 flash on and off to show a channel switching state by two bits, and the switch S1 is used to manually switch an amplifier output for inspection, adjustment, and the like.

The switching circuit 20 is connected to the external connectors CN1 and CN9 through substrate connectors CN2 and CN8 as well as connected to the switch S1 through a substrate connector CN3. Further, the switching circuit 20 is connected to the external connectors MCN#1 to MCN#4, which are connected to the amplifier circuits 10 of the respective cylinders, through substrate connectors CN4 to CN7.

Figure 3:
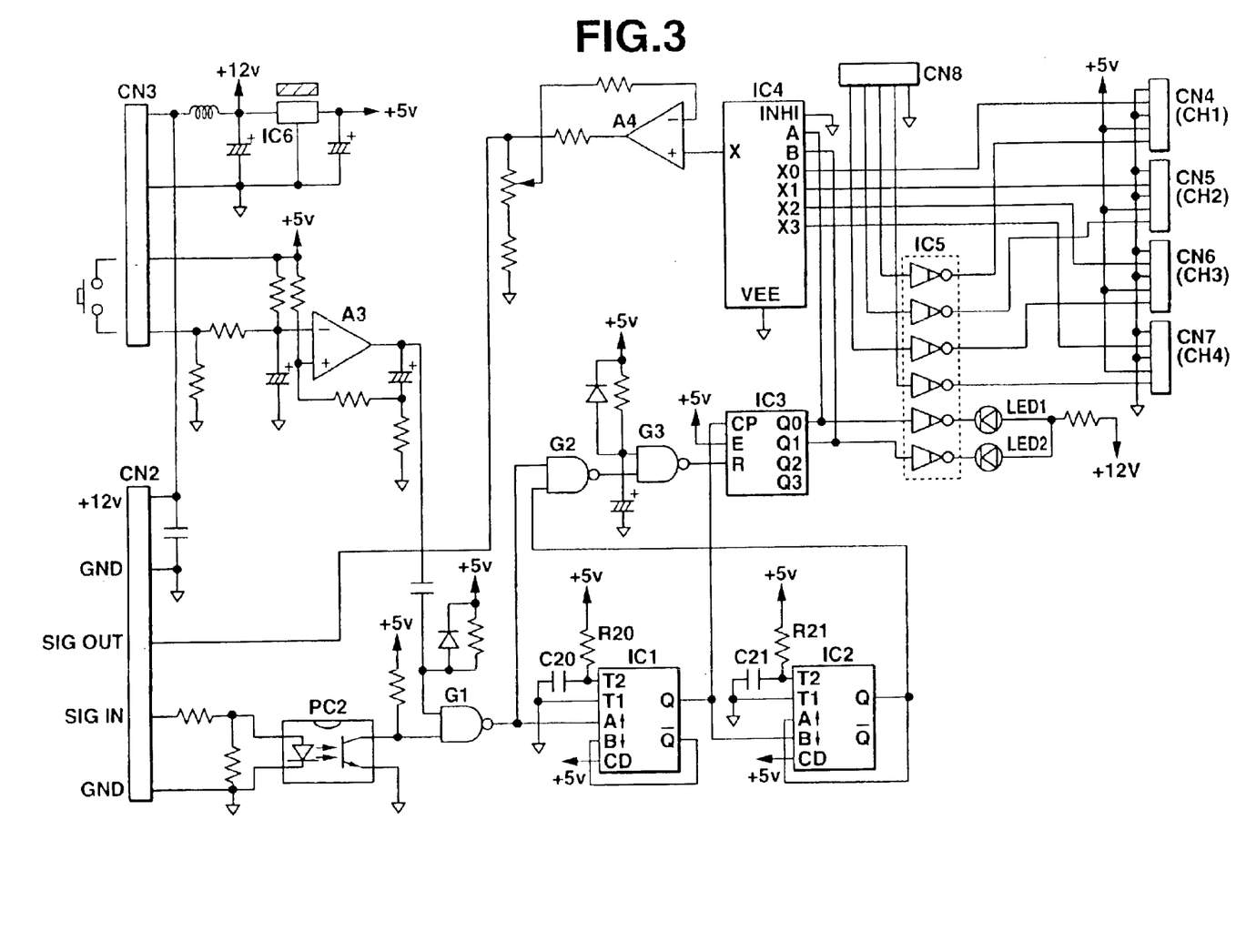
FIG. 3 is a circuit arrangement view of a channel switching unit according to the first embodiment.

As shown in FIG. 3, the switching circuit 20 is mainly composed of two timers IC1 and IC2, a counter IC3, and a multiplexer IC4. The timers IC1 and IC2 generate a one-shot pulse in response to each pulse of the channel selection signal input from the ECU. The counter IC3 counts the channel selection signal and creates address data. The multiplexer IC4 switches a signal from the amplifier unit AP#n in accordance with the address data from the counter IC3.

To explain in more detail, an input terminal of a photo coupler PC2 is connected to a channel selection signal input pin of the substrate connector CN2, and an output terminal of the photo coupler PC2 is connected to one of input terminals of a 2-input NAND gate G1. An output terminal of an amplifier A3 for a Schmitt circuit is connected to the other input terminal of the NAND gate G1, the Schmitt circuit shaping a waveform of a signal input from the switch S1 through the substrate connector CN3. An output terminal of the NAND gate G1 is connected to a trigger input (input A) of the timer IC1 and to one of the input terminals of a 2-input NAND gate G2.

Note that reference numeral IC6 denotes a three-terminal regulator constituting a power supply circuit. The regulator reduces and stabilizes a battery voltage Vb (12V) supplied through the substrate connector CN3, creates a circuit power supply +Vcc (5V), supplies the battery voltage Vb to the respective units in the channel switching unit MUX and to the amplifier units AP#1 to AP#4 connected through the substrate connectors CN4 to CN7 as a circuit power supply thereof.

An output Q of the timer IC1 is connected to a trigger input (input B) of the other timer IC2 and to a clock input (input CP) terminal of the counter IC3. The output Q of the timer IC2 is connected to the other input terminal of the NAND gate G2. A resistor R20 and a capacitor C20 are externally connected to the timer IC1, and a resistor R21 and a capacitor C21 are externally connected to the timer IC2 so that a pulse width, which is set in relation to the channel selection signal from the ECU, can be obtained.

The timer IC1 outputs the one-shot pulse having a set pulse width using an uprise of the output of the NAND gate G1 as a trigger. The timer IC2 outputs the one-shot pulse having a shorter pulse width than that of the one-shot pulse of the timer IC1 using the falling of the one-shot pulse of the timer IC1 as a trigger. Relationships among the one-shot pulse of the timers IC1, and IC2, and the channel selection signal from the ECU will be described later.

The output terminal of the NAND gate G2 is connected to the other input terminal of a two-input NAND gate G3 (that is, an inverter) of which one input terminal is fixed to a logic level "1". The output terminal of the NAND gate G3 is connected to a reset input (input R) terminal of the counter IC3. In the figure, the counter IC3 is arranged as a tetradecimal counter using low order outputs. (Q0, Q1) of a hexadecimal counter and counts up every pulse of the channel selection signal.

That is, the low order outputs (Q0, Q1) of the counter IC3 are connected to control input (inputs A, B) terminals of the multiplexer IC4 as well as connected to the light emitting diodes LED1 and LED2 through two driver amplifiers in a driver amplifier array IC5 in which six driver amplifiers are contained. Input sides of the four remaining driver amplifiers of the driver amplifier array IC5 are connected to the substrate connector CN8, and output sides thereof are connected to external reset signal input terminals of the respective amplifier units AP#1 to AP#4.

In the embodiment, the multiplexer IC4 is an analog multiplexer using terminals X0, X1, X2, X3 on a multiplex side as input terminals and a terminal X on a demultiplex side as the output terminal. The multiplexer IC4 switches an internal switch using data output from the counter IC3 as an address. The input terminals X0, X1, X2, X3 of the multiplexer IC4 are connected to amplifier output terminals of the respective amplifier units AP#1 to AP#4 through the substrate connectors CN4 to CN7. The output terminal X of the multiplexer IC4 is connected to an amplifier signal output pin of the substrate connector CN2 through an amplifier A4 for amplification.

In the combustion pressure data collection system arranged as described above, when a charge signal is outputted from the cylinder pressure sensor CPS#n according to a pressure as the engine operates, the charge signal is converted into the voltage signal by the amplifier unit AP#n, and the voltage signal is outputted to the channel switching unit MUX as an amplifier output signal. Note that it is preferable to send an external reset signal from the ECU and the like to the respective amplifier units AP#1 to #4 before the engine starts. This operation is executed to initialize the field effect transistor Q1 of the amplifier circuit 10 for confirmation by causing the field effect transistor Q1 to turn on once in response to the external reset signal to execute the electric discharge from the input of the amplifier A1 before measurement. This is because that if the charge is accumulated on the input side of the amplifier A1, there is a possibility that accurate measurement is inhibited.

In an ordinary four-stroke cycle (intake→compression→combustion→exhaust) engine, a cylinder pressure in a state where a piston reaches the vicinity of a top dead center (TDC), an exhaust valve is closed and an intake valve is opened, is at an atmospheric pressure in a natural aspiration engine and is at the atmospheric pressure added with a boost pressure (for example, about 500 mmHg–1500 mmHg) in an engine provided with a supercharger. At the time, the charge is generated in the piezoelectric device of the cylinder pressure sensor CPS#n, the charge being proportional to a pressure load in the cylinder. When the charge is shown by "q", the charge q is accumulated in the voltage conversion capacitor Cx of the amplifier unit AP#n, converted into a voltage signal +V by the amplifier A1, and output. Accordingly, a signal level when the cylinder pressure is at the atmospheric pressure is set as a zero level, and when a boost pressure exists in the cylinder, the signal level is set as the level in which the boost pressure is added to the atmospheric pressure zero level as a DC voltage component. Then, these levels are used as a basic level of a combustion waveform which rises in response to a combustion pressure generated hereinafter.

While the piston moves from the TDC to a bottom dead center (BDC), intakes is continued. In the period during which the intake is continued, no distinguishing change is observed in the cylinder pressure and the basic level is approximately maintained. Next, when the piston reaches the vicinity of the BDC, the intake valve is closed, and compressions begin while the piston moves from the BDC to the TDC, the cylinder pressure begins to increase in synchronism with the start of the compression. Accordingly, the charge of the piezoelectric device is increased and sequentially accumulated in the voltage conversion capacitor Cx, and the voltage signal +V, which is converted by and outputted from the amplifier A1, also increases.

Then, the combustion pressure is generated by an ignition executed just before the piston reaches the TDC (just before the compression pressure is set to a maximum value). The generation of the combustion pressure abruptly increases the charge of the piezoelectric device, thereby the voltage signal +V converted by and output from the amplifier A1 also abruptly increases. At the time, the signal output as the combustion pressure is the signal resulting from the basic level described above, that is, the signal results from the atmospheric pressure level in the natural aspiration engine and results from the atmospheric pressure level superimposed with the DC voltage component of the boost pressure in the engine provided with the supercharger.

Next, when the piston moves from the TDC to the BDC after the cylinder pressure is maximized and the pressure in the cylinder begins to reduce, a polarity of the charge is inverted to −q. Accordingly, the charge flows back from the voltage conversion capacitor Cx and is fed back to the piezoelectric device, thereby the voltage signal +V converted by and outputted from the amplifier A1 is also reduced. Thereafter, when the piston reaches the vicinity of the BDC, the exhaust valve is opened (the intake valve remains closed), and a combustion gas is exhausted in a stoke in which the piston moves toward the TDC, the cylinder pressure of the natural aspiration engine returns to the atmospheric pressure and the cylinder pressure of the engine provided with the supercharger returns to the boost pressure, respectively. With this operation, one combustion cycle is completed, and signal levels also return to levels before the combustion cycle starts, respectively.

When this phenomenon is observed in terms of an output of the amplifier A1, a voltage output from the amplifier A1 is "0" (Vref; 2 mV) before a pressure is applied to the cylinder pressure sensor CPS#n. Then, the amplifier A1 outputs a positive voltage simultaneously with the application of the pressure. When the pressure begins to reduce, the voltage output from the amplifier A1 is also reduced and becomes zero when there is no drift at the zero point due to the charge leakage and the temperature change.

Actually, however, a signal transmission system between the cylinder pressure sensor CPS#n and the amplifier unit AP#n has a finite insulation resistance. Accordingly, a part of the charge accumulated in the voltage conversion capacitor Cx leaks and outputs after it is superimposed with a signal voltage which shifts to a negative voltage when pressure reduction begins. Accordingly, there is a possibility that the signal voltage, which is to return to an initial level at the beginning of a pressurization may reach a negative region. That is, when the pressure is increased from zero and returned to the zero again, a charge of the cylinder pressure sensor CPS#n is made negative by an amount of the leaked charge, thereby the zero point of the signal output from the amplifier unit AP#n is drifted in a negative direction, which disturbs an accurate measurement. Further, when the cylinder pressure of the engine is measured, it is measured under an extreme temperature change condition. Thus, the drift in the positive direction with which an increase in the temperature is superimposed as an output is generated, which seems as if a pressure signal was placed on a direct current.

With respect to the drift on the negative side of the zero point due to the charge leakage and the drift on the positive side of the zero point by the temperature change, the amplifier unit AP#n automatically corrects the positive and negative drifts by the automatic correction function and maintains an amplifier output level (zero point level) to the same level when the sensor device begins and ends a charge generation.

First, the automatic correction function to the negative drift due to the charge leakage will be explained. When the charge leaks and returns to zero and the amplifier A1 intends to output a negative output, the amplifier unit AP#n detects the negative output from the amplifier A1 as the charge leakage and operates the automatic correction function so that the drift of the zero point in the negative direction due to the charge leakage is automatically corrected.

That is, the amplifier A2 inverts and amplifies the negative voltage of the amplifier A1 and applies the amplified output to the gate of the field effect transistor Q1. When a gate voltage of the field effect transistor Q1 is equal to or less than a threshold voltage Vth (about 1 to 3 V), a charge is poured (or injected) to the voltage conversion capacitor Cx through a drain-gate capacitance Cdg. However, when the gate voltage of the field effect transistor Q1 exceeds the threshold voltage Vth, a conduction of the electricity begins between the drain and the source. As a result, an electric discharge is executed from the sensor through the field effect transistor Q1, and the voltage of the output terminal of the amplifier A1 is set to "0" (2 mV).

The automatic correction of the negative drift executed by the amplifier A2 and the field effect transistor Q1 constitutes a kind of a negative feedback circuit when an output is negative, when it is viewed from the amplifier A1 side. That is, the automatic correction is executed by causing the input of the amplifier A1 to be conducted to the zero point by the field effect transistor Q1. Thereafter, when the pressure increases, the amplifier A1 operates using a lowest pressure (including a negative pressure) as the zero point, and this state is maintained as long as the input of the amplifier A1 is in a negative region.

In the state that the automatic correction continues to function with respect to the drift in the negative direction, a positive voltage is applied to the gate of the field effect transistor Q1, and when the pressure does not continuously change, the positive voltage is balanced at a certain point, and the balanced state is maintained. Although the balanced state is affected by parameters such as the voltages of respective units, gains and offsets of the amplifiers A1 and A2, the threshold voltage Vth of the field effect transistor Q1, a mutual conductance gm, and the like, the output of the amplifier A1 is set to about zero.

That is, when the gate voltage of the field effect transistor Q1 drops, the charge accumulated in the drain-gate capacitance Cdg actuates to reduce the input voltage of the amplifier A1, thereby the gate voltage is increased through the amplifiers A1 and A2. This is the same as the case where the gate voltage increases on the other hand. Accordingly, unless the other voltages of the amplifiers fluctuate, the above state is maintained, and when the pressure shifts to increase from the state of a lowest pressure, the output of the amplifier A1 shifts to a positive voltage and increases.

On the other hand, a positive drift is automatically corrected by bringing the field effect transistor Q1 into a conductive state by the comparators C1 and C2 and the timer T1, and a direct current component due to the temperature is removed by executing an electric discharge of the input side of the amplifier A1. The automatic correction to the positive drift begins when a level drift exceeds a little level higher than a predicted maximum amount of drift in a process in which a pressure increases and then decreases beyond a peak. Specifically, when the output of the amplifier A1 increases beyond a comparative voltage Vr2 of the comparator C2 and thereafter decreases beyond the peak and becomes less than the comparative voltage Vr1 of the comparator C1, the field effect transistor Q1 is turned on and the voltage at the output terminal of the amplifier A1 is set to "0" (2 mV).

The comparative voltage Vr2 of the comparator C2 is given as the voltage obtained by dividing the circuit voltage Vcc by the resistors R9 and R10 in the state that the timer T1 is not triggered (in the state that the output Q is in a low level). This voltage is set to the voltage that is slightly higher with respect to the maximum drift in the positive direction between the combustion cycles in consideration of a noise and the like although the voltage is different depending on the sensor. Then, the output of the amplifier A1 is compared with the comparative voltage Vr2 in the comparator C2, and when the output of the amplifier A1 is higher than the comparative voltage Vr2, the output of the comparator C2 changes from the low level (0 V) to the high level (5 V).

At the time, a part of the output of the comparator C2 is fed back to the no-inverting input terminal of the comparator C2 through the diode D3 and the resistor R11. As the result, the comparator C2 is placed in a self-held state, thereby the output of the comparator C2 is kept in the high level regardless of the output of the amplifier A1. In this state, the comparative voltage Vr1 of the comparator C1 is the voltage obtained by dividing the output of the comparator C2 by resistance values of the resistors R7 and R8 (Vr1=5×R8/(R7+R8)) and set to a lower value than the comparative voltage Vr2 setted from the predicted maximum amount of the drift in the positive direction.

After the comparator C2 detects that the pressure is in an increasing process, when the pressure shifts to a decreasing process beyond the peak and the output of the amplifier A1 becomes lower than the comparative voltage Vr1 of the comparator C1 in the pressure decreasing process, the output Q of the comparator C1 is set to the high level (5 V). As the result, the timer T1 is trigged by a rising edge of the high level output of the comparator C1.

When the timer T1 is triggered, the one-shot pulse having the pulse width determined by the resistor Rt and the capacitor Ct is outputted. The pulse width of the one-shot pulse is from several hundreds of nanoseconds to several tens of microseconds although this is different depending on a semiconductor device to be used. A higher voltage than the threshold voltage Vth is applied to the gate of the field effect transistor Q1 by the pulse (output Q) from the timer T1, thereby the field effect transistor Q1 is brought into conductive between the drain and the source. As the result, the electric discharge is executed regardless of the input state of the sensor signal, and the input of the amplifier A1 is set to "0" (2 mV). At the same time, since the output Q of the timer T1 is set to the high level (5 V), thereby the comparative voltage Vr2 of the comparator C2 is set to 5 V and the self-held state of the comparator C2 is released.

When the pulse signal of the timer T1 disappears, the gate voltage of the field effect transistor Q1 decreases to zero due to the gate resistance Rg. Accordingly, when the gate voltage is equal to or less than the threshold voltage Vth, the charge accumulated in the drain-gate capacitance Cdg is delivered to the voltage conversion capacitor Cx, and thus the input of the amplifier A1 is made negative. At the time, the input voltage of the amplifier A1 is $-Vth \cdot Cdg/(Cs+Cx+Cdg+Cds)$ (where, Cs: floating capacitance of leaked charge, Cds: capacitance between drain-sources). The voltage has a sufficient value to automatically correct the negative drift described above, and a circuit operates using the point as a zero point regardless of an input. When the pressure falls, the automatic correction operates to the negative drift, and the circuit operates using the lowest pressure point as the zero point.

Figure 4A:
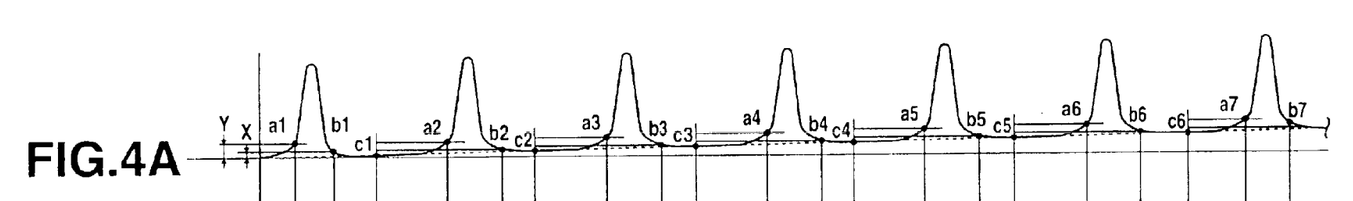
FIGS. 4A to 4F are time charts of a sensor outputs from respective units of the amplifier circuit according to the first embodiment.
Figure 4B:
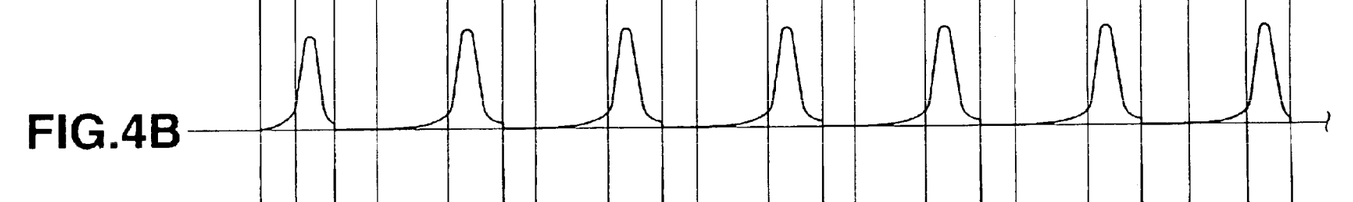

The above operations will be explained using the time charts of FIGS. 4A to 4F. In the time charts of FIGS. 4A to 4F, FIG. 4A shows a sensor output including the drift, FIG. 4B shows the amplifier output after an automatic correction, FIG. 4C shows the output of the comparator C1, FIG. 4D shows the output of the timer T1, FIG. 4E shows the output of the comparator C2, and FIG. 4F shows a period during which the automatic correction operates to a negative drift.

Figures 4C, 4D, 4E:
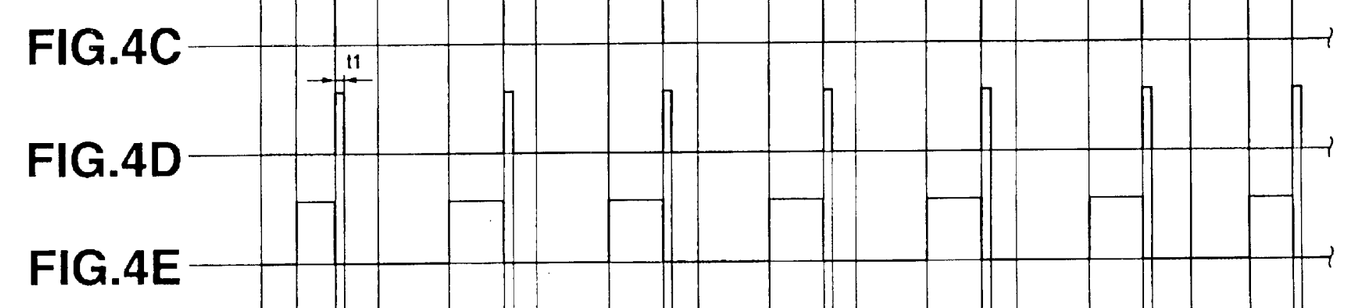
Figure 4F:
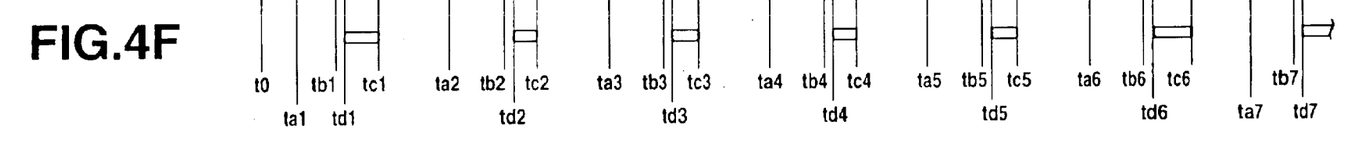

First, when the sensor output begins to increase from a zero level (time t 0) and reaches a point a1 of an output Y (time t a1), an increasing direction of the sensor output is detected by the comparator C2, the output of the comparator C2 is set to the high level (5 V) as shown in FIG. 4E, and this state is held. The output Y corresponds to the comparative voltage Vr2 of the comparator C2, which is set to a value a little higher than the predicted maximum amount of drift in the positive direction. Accordingly, even if the zero level of the sensor output is increased due to a generation of the drift, the increasing direction of the sensor output from the zero level due to the increase of the pressure can be securely detected by the comparator C2.

Next, when the sensor output further increases and shifts to a decreasing condition beyond the peak and reaches a point b1 of an output X which corresponds to the comparative voltage Vr1 of the comparator C1 (time t b1), the output of the comparator C1 shown in FIG. 4C is inverted from the low level to the high level, thereby the one-shot pulse is outputted from the timer T1 as shown in FIG. 4D. When the one-shot pulse (pulse width; t 1) is outputted from the timer T1, the field effect transistor Q1 is brought into the conductive condition between the drain and the source to thereby reset the input of the amplifier A1.

As the result, the amplifier output drops to the zero point at the point b1 as shown in FIG. 4B, and the zero point level of the amplifier output is kept constant regardless of presence or absence of the drift of the sensor output. Further, as shown in FIG. 4E, the output of the comparator C2 is returned from the high level to the low level and the self-held state is released, and the output from the comparator C1 is also setted to the low level.

Thereafter, when the sensor output further drops from the point b1, no one-shot pulse is output from the timer T1, and the output is in a negative region (time t d1), a negative drift is automatically corrected by the amplifier A2 as shown in FIG. 4F. When a minimum point just before the sensor output shifts to increase is shown by c1, the automatic correction of the negative drift is stopped when the amplifier output shifts to increase from the minimum point c1 (time t c1). Thereafter, when the operation is executed in the same way as those of the times t a2, t b2, t d2, t c2 to t an, t bn, t dn, t cn of the respective cycles and the drift is in an increasing direction, the sensor output is outputted by subtracting a minimum value just before a previous cycle therefrom. The operation is executed likewise when there is no drift and when the drift is in a decreasing direction.

As described above, the amplifier unit AP#n has the automatic correction function to the positive and negative drifts caused by the charge leakage and the temperature change. Accordingly, offsets of the signal levels, which are accumulated at each cycle due to the charge leakage, can be corrected, the charge leakage generated due to frequent changes that the pressure abruptly increases and decreases continuously and repeatedly, and thus the charge promptly flows in and out in proportion to pressure fluctuations. Further, an output error due to the temperature change can also be reduced.

Next, combustion pressure data, which is converted into a voltage signal by the amplifier unit AP#n, is switched by the channel switching unit MUX in response to a channel selection signal sent from the ECU and sent to the ECU. The channel switching unit MUX counts a pulse train of the channel selection signal by the counter IC3 and switches the signal from the amplifier unit AP#n according to a counter value of the counter IC3.

Figure 5:
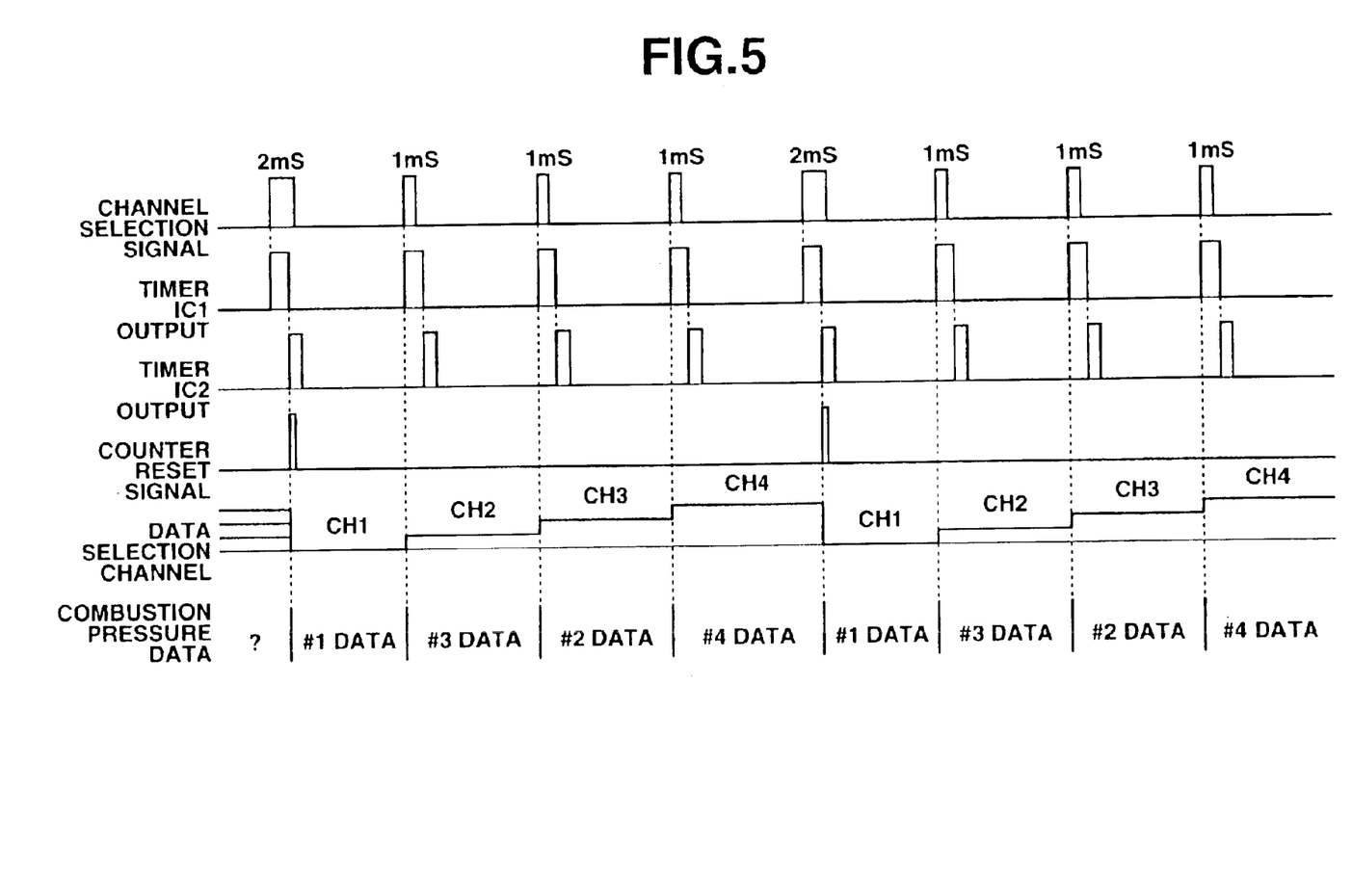
FIG. 5 is the time chart according to the first embodiment, the time chart showing a channel selection signal, the timings at which combustion pressure data is selected, and the timings at which a reset signal is sent.
Figure 6:
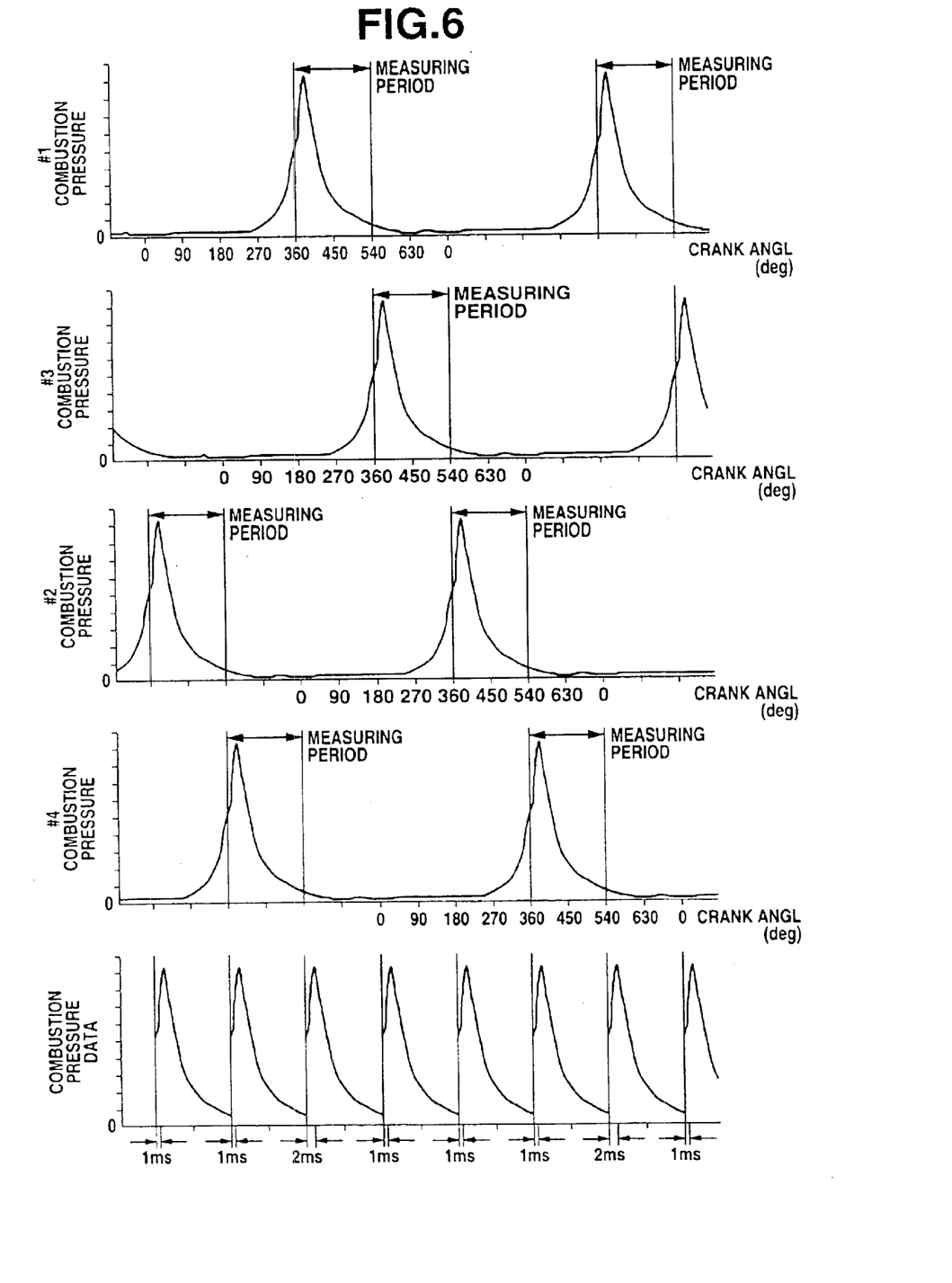
FIG. 6 is the time chart according to the first embodiment, the time chart showing the timings at which the combustion pressure data is switched.

The channel selection signal is the signal that is outputted on the basis of a result of a determination of the cylinder executed in the ECU in response to, for example, a signal output from a crank angle sensor and a signal output from a cam angle sensor. Specifically, as shown in FIGS. 5 and 6, the channel selection signal is the signal which is outputted in synchronism with rotation of the engine and of which one cycle is composed of one pulse having a pulse width of 2 msec and subsequent three pulses each having a pulse width of 1 msec. The pulse of 2 msec corresponds to the #1 cylinder, and the following three pulses of 1 msec correspond to the respective cylinders in the sequence of combustions, that is, to the #3 cylinder, the #2 cylinder, and the #4 cylinder, respectively.

In the embodiment, as shown in FIG. 6, the combustion pressure of each cylinder is measured during a period of a crank angle 180° CA from a compression TDC to the BDC of each cylinder. That is, a pulse of 2 msec is output at the compression TDC of the #1 cylinder, a next pulse of 1 msec is outputted at the compression TDC of the #3 cylinder, a second pulse of 1 msec is outputted at the compression TDC of the #2 cylinder, and a third pulse of 1 msec is outputted at the compression TDC of the #4 cylinder. Measurement data from the start to the end of the combustion of the respective cylinders is switched in the sequence of the combustion and sent to the ECU.

The timers IC1 and the IC2 in the channel switching unit MUX are setted to generate the one-shot pulses of 1.5 msec and 1 msec, respectively to identify the pulses of 2 msec and 1 msec with respect to the channel selection signal as described above. The counter IC3 is resetted at each time when the pulse equal to or longer than 1.5 msec (that is, the pulse of 2 msec) of the pulse train of the channel selection signal is inputted.

In more details, when the channel selection signal is sent to the channel switching unit MUX, the channel selection signal is inputted to the NAND gate G1 after the signal is insulated and inverted by the photo coupler PC2, and the same pulse of 2 msec is outputted from the NAND gate G1 (however, it is assumed that a signal manually switched by the switch S1 is not inputted here). The pulse of 2 msec from the NAND gate G1 is inputted to the NAND gate G2 and the timer IC1 at the same time, and the timer IC1 is triggered by the rising edge of the signal.

As the result, the pulse of 1.5 msec is outputted from the timer IC1 as shown in a time chart of FIG. 5. The pulse of 1.5 msec is inputted to the counter IC3 and counted up and further inputted to the timer IC2. The timer IC2 is triggered by a falling (downwardly protruded) edge of the pulse of 1.5 msec from the timer IC1. The pulse of 1 msec is inputted to the NAND gate G2, and the pulse of 2 msec therefrom is ANDed (or multiplied) with a pulse of 1 msec through the NAND gate G3 (which functions as an inverter) and is input to a reset input terminal of the counter IC3.

That is, the pulse of 0.5 msec is created by the pulse of 2 msec of the channel selection signal and the pulse of 1 msec from the timer IC2 and inputted to the counter IC3 as a reset pulse. Accordingly, when the pulse of 2 msec of the channel selection signal is inputted, the counter IC3 is counted up once and then resetted at once, thereby a counter value is set to 0.

The pulses of 1.5 msec and 1 msec are outputted from the timers IC1 and IC2, respectively in response to the pulse of 1 msec subsequent to the pulse of 2 msec of the channel selection signal. However, since there is a time lag between the pulse of 1 msec of the channel selection signal and the pulse of 1 msec from the timer IC2, no reset pulse is created to the counter IC3. Accordingly, the counter IC3 is counted up and the counter value is set to 1. Thereafter, the counter IC3 is counted up each time the pulse of 1 msec of the channel selection signal is inputted and the counter value is incremented. When the pulse of 2 msec is inputted, the counter IC3 is resetted and the counter value is returned to 0.

That is, when the pulse of the channel selection signal to be inputted is equal to or longer than 1.5 msec, the counter IC3 is resetted, and when the pulse is shorter than 1.5 msec, the counter IC3 is counted up, thereby the counter value (address data) applied to the multiplexer IC4 is changed. The multiplexer IC4 executes a switching operation in response the counter value so as to select a data selection channel corresponding to a combustion start cylinder to be measured and outputs a signal from a corresponding amplifier unit AP#n to the ECU (refer to the time chart of FIG. 5).

The relation among counter values, the data selection channel, and the cylinder number is as shown below. That is, the combustion pressure data of the #1 cylinder is selected by a pulse input of 2 msec (counter value: 0) of the channel selection signal, and the combustion pressure data of the next #3 cylinder is selected by a next pulse input of 1 msec (counter value: 1). Further, the combustion pressure data of the #2 cylinder is selected by a second pulse input of 1 msec (counter value: 2) of the channel selection signal, and the combustion pressure data of the #4 cylinder is selected by a third pulse input of 1 msec (counter value: 3). As shown in FIG. 6, repetition of the above process sequentially switches the combustion pressure data of the respective cylinders, and the combustion pressure data is transmitted to the ECU as a series of continuous data, by which the ECU can optimally control the combustions of the respective cylinders.

| Counter value | Data section channel/Cylinder number |
| --- | --- |
| 0 | CH1/#1 |
| 1 | CH2/#3 |
| 2 | CH3/#2 |
| 3 | CH4/#4 |

As described above, in the embodiment, the data obtained by measuring combustion pressure of each cylinder of the multi-cylinder engine can be accurately and effectively collected with a simple arrangement without executing complex processes for coping with the change of the outputs from the sensors due to the charge leakage from the sensors, an individual difference of the sensors, the temperature change, and the like, by which a load on the engine control unit can be reduced. Further, the optimum combustion control can be effectively utilized by the minimum process by using the single continuous input signal regardless of the number of the cylinders.

With the above arrangement, the engine control unit can be prevented from being increased in size and made complex. Further, the number of matching steps between the sensors and the engine control unit and the number of wirings between the sensors and the engine control unit can be reduced, thereby improvements of the combustion efficiency for reducing $CO_2$ and optimum control of the engine for reducing harmful exhaust emissions can be realized at low cost.

Figure 7:
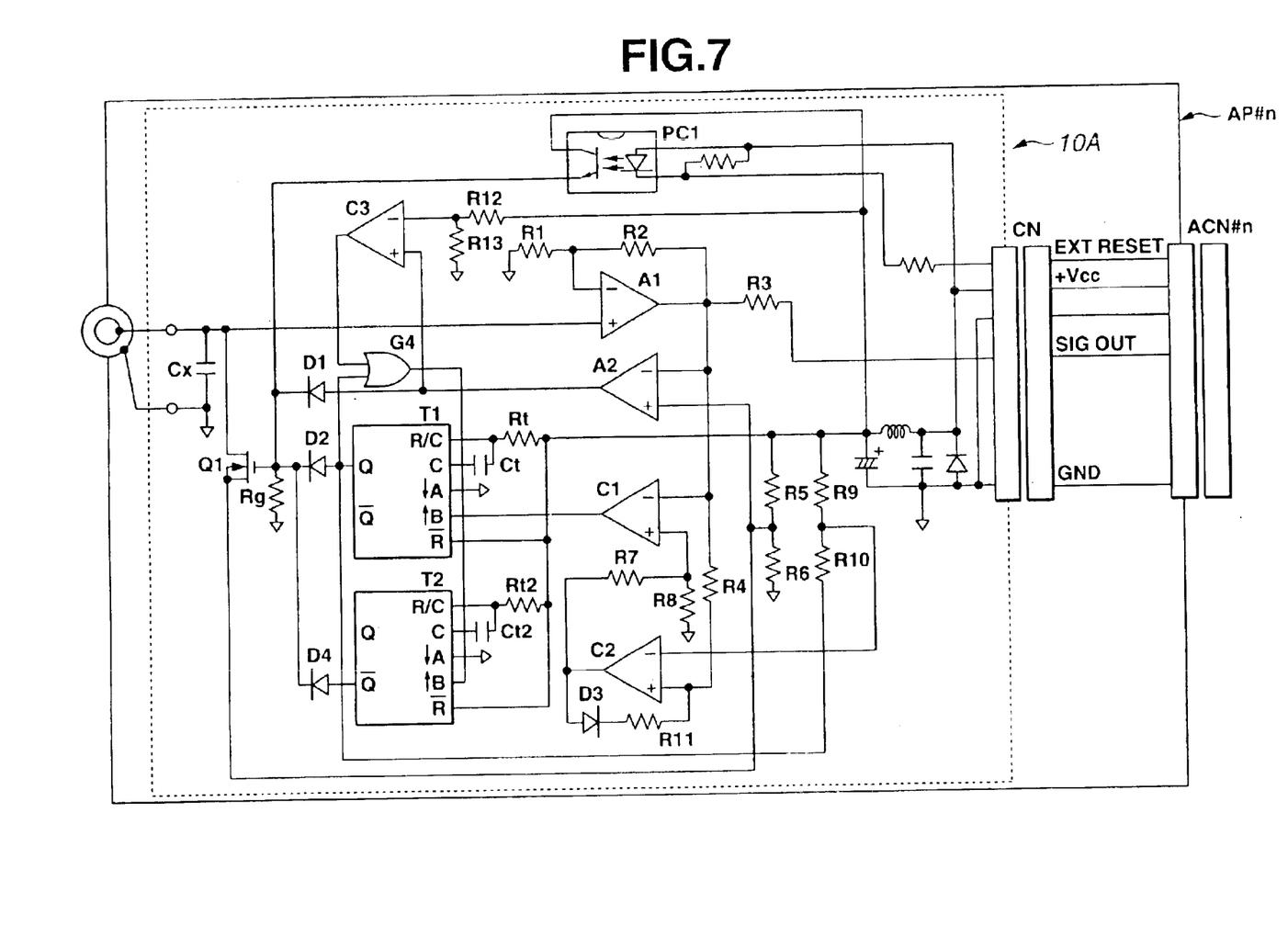
FIG. 7 is a circuit arrangement view of an amplifier unit according to a second embodiment of the present invention.

Next, a second embodiment of the present invention will be explained. FIG. 7 is a circuit arrangement view of an amplifier unit according to a second embodiment of the present invention.

When a large amount of the charges remains on an input side of the amplifier A1 in an initial state just after a circuit is energized or at a time the engine is restarted after the engine stalls or when an actual amount of the drift exceeds a predicted maximum amount of the drift due to the temperature increase in operation, there is a possibility that the input of the amplifier A1 does not drop to the level where the automatic correction function operates in the amplifier unit AP#n.

In this case, an initialization is executed by resetting the input side of the amplifier A1 using an external reset signal as described above. In the second embodiment, however, an abnormality monitor function actuating as a so-called watch dog timer is additionally provided to monitor the output of the amplifier A2 and the output of the timer T1. With this arrangement, when both the outputs are not normally delivered, the field effect transistor Q1 is forcibly turned on and automatically resetted.

FIG. 7 specifically shows an amplifier circuit 10A provided with the abnormality monitor function. The amplifier circuit 10A is arranged by adding a timer T2, an OR a gate G4, and a comparator C3 to the amplifier circuit 10 described in the first embodiment, the timer T2 being continuously retriggered by the output of the amplifier A2 or by the output of the timer T1 in a normal operation.

That is, the output terminal of the amplifier A2 is connected to the gate of the field effect transistor Q1 through the diode D1 as well as connected to one input terminal of the OR gate G4 through the comparator C3. The comparator C3 is used to adjust a logic level with respect to the OR gate G4 on a rear stage. The output of the amplifier A2 is converted into a logical level by comparing the output of the amplifier A2 with a reference voltage obtained by dividing the circuit voltage Vcc by resistors R12 and R13.

The output Q terminal of the timer T1 is connected to the other input terminal of the OR gate G4, and an output terminal of the OR gate G4 is connected to a trigger input (input B) terminal of the timer T2. The timer T2 is a retrigger possible type timer for outputting the one-shot pulse having the pulse width determined by an external resistor Rt2 and an external capacitor Ct2, and an inverting output Q terminal of the timer T2 is connected to the gate of the field effect transistor Q1 through a diode D4.

In the amplifier circuit 10A provided with the abnormality monitor function, the timer T2 is continuously retriggered by the output of the amplifier A2 or by the output from the timer T1 in the state that the automatic correction function normally operates. The pulse width of the one-shot pulse of the timer T2 is set longer than a length of one cycle of an output of the sensor when the output increases and decreases. Accordingly, as long as the timer T2 is retriggered, an inverting output 0 of the timer T2 is maintained to the low level at all times, which does not affect an intrinsic operation of the amplifier circuit 10A at all.

In contrast, when an abnormal state occurs in which both the outputs of the amplifier A2 and the timer T1 are maintained in a state of "0", the timer T2 cannot be triggered by the OR gate G4. Accordingly, the no-inverting output Q of the timer T2 is set to the high level, thereby the field effect transistor Q1 is turned on. With the above operation, electrical discharge is executed from the input side of the amplifier A1. The automatic reset of the input side of the amplifier A1 executed by the timer T2 enables the automatic correction function to operate thereafter. Accordingly, the timer T2 is triggered and the inverting output Q thereof is set to the low level, and thus a normal operation is restored.

With the above operation, even if a large amount of the charge remains on the input side of the amplifier A1 due to any factors in the initial state after the amplifier circuit 10A is energized or even if the actual amount of the drift exceeds the predicted maximum amount of the drift due to the temperature increase during the operations, the input side of the amplifier A1 can be automatically resetted without being affected by an external reset signal, thereby the amplifier circuit 10A can be securely operated.

As described above, the combustion pressure data collection system for the multi-cylinder engine according to the present invention can effectively collect the combustion pressure data of each cylinder in a simple arrangement without requiring complex processing and can realize the optimum control of the engine which can improve the combustion efficiency and reduce harmful exhaust emissions at low cost.

In the present invention, it is understood that various embodiments can be arranged in a wide range based on the present invention without departing from the spirit and the scope of the present invention. The present invention is by no means restricted by the particular embodiments thereof except that it is restricted by the accompanying claims.

What is claimed is:

1. A combustion pressure data collection system for a multi-cylinder engine, comprising:

a cylinder pressure sensor attached to respective cylinders for outputting a charge signal according to a cylinder pressure;

an amplifier circuit connected to the cylinder pressure sensor for converting said charge signal into a voltage signal and outputting the voltage signal as well as automatically correcting a voltage output level so as to be setted to a same level before and after the cylinder pressure sensor generates a charge; and a switching circuit for selecting a channel to be measured from an output signal of the amplifier circuit of the respective cylinders in response to a signal based on a result of determination of a cylinder number.

2. The combustion pressure data collection system for the multi-cylinder engine according to claim 1, wherein:

said amplifier circuit comprises an automatic correction function for automatically collecting a drift in a negative direction due to a leakage of a charge generated in a signal transmission system and said drift in a positive direction due to a temperature change and for making an output level of the voltage signal converted from the charge signal before and after the sensor generate said charge to a same level thereof.

* * * * *